United States Patent
Davidson

(10) Patent No.: US 9,791,876 B2
(45) Date of Patent: Oct. 17, 2017

(54) CURRENT LIMITER

(71) Applicant: Alstom Technology Ltd, Baden (CH)

(72) Inventor: Colin Charnock Davidson, Stafford (GB)

(73) Assignee: GENERAL ELECTRIC TECHNOLOGY GMBH (CH)

( * ) Notice: Subject to any disclaimer, the term of this patent is extended or adjusted under 35 U.S.C. 154(b) by 0 days.

(21) Appl. No.: 14/782,785

(22) PCT Filed: Feb. 18, 2014

(86) PCT No.: PCT/EP2014/053160
§ 371 (c)(1),
(2) Date: Oct. 6, 2015

(87) PCT Pub. No.: WO2014/166660
PCT Pub. Date: Oct. 16, 2014

(65) Prior Publication Data
US 2016/0048149 A1  Feb. 18, 2016

(30) Foreign Application Priority Data

Apr. 12, 2013 (EP) .................................. 13163575

(51) Int. Cl.
*G05F 1/59* (2006.01)
*H01H 9/54* (2006.01)
(Continued)

(52) U.S. Cl.
CPC ............... *G05F 1/59* (2013.01); *H01H 9/547* (2013.01); *H02H 3/025* (2013.01); *H02H 9/001* (2013.01); *H02H 9/047* (2013.01)

(58) Field of Classification Search
CPC . G05F 1/59; H01H 9/547; H01H 9/54; H02H 3/025; H02H 9/001; H02H 9/047; H02H 3/02
(Continued)

(56) References Cited

U.S. PATENT DOCUMENTS 4,805,082 A * 2/1989 Heinrich ............. H02M 7/1626
363/129
5,216,352 A * 6/1993 Studtmann .............. G01S 19/02
323/235
(Continued)

FOREIGN PATENT DOCUMENTS

CN  101073188 A  11/2007
EP  0 474 186 A2  3/1992
(Continued)

OTHER PUBLICATIONS

International Search Report and Written Opinion, PCT/EP2014/053160, Alstom Technology Ltd, 11 pages (Jun. 2, 2014).
(Continued)

*Primary Examiner* — Kyle J Moody
(74) *Attorney, Agent, or Firm* — GE Global Patent Operation; Scott R. Stanley

(57) ABSTRACT

A current limiter for selectively limiting a rate of change of current in a DC electrical network may include a first electrical block including an inductive element and a second electrical block including a bidirectional switch. The first electrical block is connected in parallel with the second electrical block between first and second terminals, and the first and second terminals are connectable to the DC electrical network. The bidirectional switch is switchable to: (1) a first mode to permit current flow through the second electrical block in a first current direction and at the same time inhibit current flow through the second electrical block in a second, opposite current direction; and (2) a second
(Continued)

mode to permit current flow through the second electrical block in the second current direction and at the same time inhibit current flow through the second electrical block in the first current direction.

17 Claims, 5 Drawing Sheets

(51) Int. Cl.
*H02H 3/02* (2006.01)
*H02H 9/00* (2006.01)
*H02H 9/04* (2006.01)

(58) Field of Classification Search
USPC .............. 323/268, 269, 350, 270; 327/540; 361/13, 8, 9, 93.9; 307/134
See application file for complete search history.

(56) References Cited

U.S. PATENT DOCUMENTS

| | | | |
|---|---|---|---|
| 5,305,174 A * | 4/1994 | Morita | H02H 7/30 361/58 |
| 5,726,843 A | 3/1998 | Arita et al. | |
| 5,867,356 A * | 2/1999 | Duggal | H02H 3/025 323/293 |
| 5,883,774 A | 3/1999 | Kida et al. | |
| 5,986,906 A | 11/1999 | Ramezani et al. | |
| 6,535,366 B1 * | 3/2003 | Frohlich | H01H 3/222 361/10 |
| 8,842,404 B2 | 9/2014 | Vogel | |
| 8,994,483 B2 | 3/2015 | Dupraz et al. | |
| 9,202,641 B2 | 12/2015 | Berard et al. | |
| 9,202,645 B2 | 12/2015 | Berard et al. | |
| 9,240,680 B2 | 1/2016 | Hartmann et al. | |
| 2003/0183838 A1 | 10/2003 | Huang et al. | |
| 2007/0253131 A1 | 11/2007 | Juengst et al. | |
| 2009/0134850 A1 * | 5/2009 | Berggren | H02J 3/1814 323/215 |
| 2009/0147411 A1 * | 6/2009 | Ingestrom | H02J 3/1807 361/16 |
| 2011/0007530 A1 * | 1/2011 | Swamy | H02M 1/36 363/37 |
| 2015/0002977 A1 | 1/2015 | Dupraz et al. | |

FOREIGN PATENT DOCUMENTS

| | | |
|---|---|---|
| EP | 0 823 773 A2 | 2/1998 |
| EP | 1 768 244 A1 | 3/2007 |
| EP | 2 669 921 A1 | 12/2013 |
| EP | 2 701 254 A1 | 2/2014 |
| EP | 2 701 255 A1 | 2/2014 |
| EP | 2 768 102 A1 | 8/2014 |
| FR | 1357974 | 4/1964 |
| FR | 1357975 | 4/1964 |
| WO | WO-92/09943 | 6/1992 |
| WO | WO 92/09943 A1 | 6/1992 |
| WO | WO-98/27635 | 6/1998 |
| WO | WO 98/27635 A1 | 6/1998 |
| WO | WO 2010/089338 A2 | 8/2010 |
| WO | WO-2010/089338 A2 | 8/2010 |
| WO | WO-2010/097113 A1 | 9/2010 |
| WO | WO-2011/157305 A1 | 12/2011 |
| WO | WO-2011/157306 A1 | 12/2011 |
| WO | WO-2012/104371 A1 | 8/2012 |
| WO | WO-2012/104377 A1 | 8/2012 |
| WO | WO-2012/126714 A1 | 9/2012 |
| WO | WO-2013/092873 A1 | 6/2013 |
| WO | WO-2013/092878 A1 | 6/2013 |
| WO | WO 2012/123014 A2 | 9/2013 |
| WO | WO-2013/127462 | 9/2013 |
| WO | WO-2013/178696 A1 | 12/2013 |
| WO | WO-2014/029542 A1 | 2/2014 |
| WO | WO-2014/029886 A2 | 2/2014 |
| WO | WO-2014/124713 A1 | 8/2014 |

OTHER PUBLICATIONS

Hafner, J. et al., "Proactive Hybrid HVDC Breakers FFD013 A key innovation for reliable HVDC grids," CIGRE Symposium, Bologna, Italy, 9 pages (Sep. 13-15, 2011).

English-language machine translation of FR 1357975, Machf Werklust N.V. (Apr. 10, 1964).

Office Action issued in connection with corresponding CN Application No. 201480033377.5 dated Jun. 26, 2017.

* cited by examiner

CURRENT LIMITER

CROSS REFERENCE TO RELATED APPLICATIONS

The present application is a National Stage of International Application No. PCT/EP2014/053160, filed Feb. 18, 2014, which claims priority to European Application No. 13163575.7, filed Apr. 12, 2013, which is incorporated herein by reference in its entirety.

The invention relates to a current limiter.

In power transmission networks alternating current (AC) power is typically converted to direct current (DC) power for transmission via overhead lines and/or undersea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC to DC power is also utilized in power transmission networks where it is necessary to interconnect AC networks operating at different frequencies. In any such power transmission network, converters are required at each interface between AC and DC power to effect the required conversion.

HVDC converters are vulnerable to DC side faults or other abnormal operating conditions that can present a short circuit with low impedance across the DC power transmission lines or cables. Such faults can occur due to damage or breakdown of insulation, lightning strikes, movement of conductors or other accidental bridging between conductors by a foreign object.

The presence of low impedance across the DC power transmission lines or cables can be detrimental to a HVDC converter. Sometimes the inherent design of the converter means that it cannot limit current under such conditions, resulting in the development of a high fault current exceeding the current rating of the HVDC converter. Such a high fault current not only damages components of the HVDC converter, but also results in the HVDC converter being offline for a period of time. This results in increased cost of repair and maintenance of damaged electrical apparatus hardware, and inconvenience to end users relying on the working of the electrical apparatus. It is therefore important to be able to interrupt the high fault current as soon as it is detected.

A conventional means of protecting a HVDC converter from DC side faults, in cases where the converter control cannot limit the fault current by any other means, is to trip an AC side circuit breaker, thus removing the supply of current that feeds the fault through the HVDC converter to the DC side. This is because there are currently no commercially available HVDC circuit breaker designs. Furthermore, almost all HVDC schemes are currently point-to-point schemes with two HVDC converters connected to the DC side, whereby one HVDC converter acts as a power source with power rectification capability and the other HVDC converter acts as a power load with power inversion capability. Hence, tripping the AC side circuit breaker is acceptable because the presence of a fault in the point-to-point scheme requires interruption of power flow to allow the fault to be cleared.

A new class of HVDC power transmission networks is being considered for moving large quantities of power over long distances, as required by geographically dispersed renewable forms of generation, and to augment existing capabilities of AC power transmission networks with smart-grid intelligence and features that are able to support modern electricity trading requirements.

Such a HVDC power transmission network requires multi-terminal interconnection of HVDC converters, whereby power can be exchanged on the DC side using three or more HVDC converters operating in parallel. Each HVDC converter acts as either a source or sink to maintain the overall input-to-output power balance of the network whilst exchanging the power as required. Faults in the HVDC power transmission network need to be quickly isolated and segregated from the rest of the network in order to enable the network to resume normal power transmission as soon as possible.

Current interruption in conventional AC circuit breakers is carried out when the current reaches a current zero, so as to considerably reduce the difficulty of the interruption task. Thus, in conventional circuit breakers, there is a risk of damage to the current interruption apparatus if a current zero does not occur within a defined time period for interrupting the current. It is therefore inherently difficult to carry out DC current interruption using a DC circuit breaker because, unlike AC current in which current zeros naturally occur, DC current cannot naturally reach a current zero.

Moreover a DC circuit breaker typically not only requires an operating speed that is an order of magnitude faster than the operating speed of an AC circuit breaker, but also must be capable of interrupting a fault current that is rising at a high rate (up to 10 A/μs). The rate of rise of fault current is a critical parameter in the design of a DC circuit breaker, since a finite operating time must elapse before the DC circuit breaker is capable of inserting any back electromotive force (emf) to cause the fault current to start falling again. A high rate of rise of fault current leads to a high peak fault current, thereby requiring the DC circuit breaker to have larger and costlier switching components to interrupt the fault current.

According to an aspect of the invention, there is provided a current limiter for selectively limiting a rate of change of current in a DC electrical network, the current limiter comprising:
  a first electrical block including an inductive element; and
  a second electrical block including a bidirectional switch, the first electrical block being connected in parallel with the second electrical block between first and second terminals, the first and second terminals being connectable to the DC electrical network,
  wherein the bidirectional switch is switchable to a first mode to permit current flow through the second electrical block in a first current direction and at the same time inhibit current flow through the second electrical block in a second current direction, the first and second current directions being opposite to each other, and the bidirectional switch is switchable to a second mode to permit current flow through the second electrical block in the second current direction and at the same time inhibit current flow through the second electrical block in the first current direction, and
  wherein the current limiter further includes a controller to control the switching of the bidirectional switch to each of the modes.

For the purposes of the specification, the first current direction is from the first terminal to the second terminal while the second current direction is from the second terminal to the first terminal.

In use, the current limiter may be used in combination with a DC circuit interruption device. It will be appreciated that the current limiter according to the invention may also be used as a stand-alone device.

During normal operation of the DC electrical network, a normal operating current of the DC electrical network flows in both the DC electrical network and current limiter. At this stage the bidirectional switch is switched to block the normal operating current from flowing through the second electrical block. This means that the normal operating current flows through the inductive element of the first electrical block but is inhibited from flowing through the second electrical block during normal operation of the DC electrical network.

Depending on the current direction of the normal operating current, the bidirectional switch may be switched to the first or second mode to block the normal operating current from flowing through the second electrical block during normal operation of the DC electrical network.

Optionally the bidirectional switch may be further adapted to enable the bidirectional switch to block the normal operating current from flowing through the second electrical block during normal operation of the DC electrical network. For example, the bidirectional switch may be switchable to a blocking mode to inhibit current flow through the second electrical block in the first and second current directions.

During the occurrence of a fault in the DC electrical network, a high fault current flows in both the DC electrical network and the current limiter, thus resulting in a rise in current flowing through the inductive element. At this stage the bidirectional switch is switched to block the fault current from flowing through the second electrical block. The rise in current flowing through the inductive element causes a corresponding increase in magnetic flux, the rate of change of which in turn generates an emf that opposes the rise of current flowing through the inductive element. This enables the inductive element to slow down the rate of rise of current in the DC electrical network until the DC circuit interruption device is opened to insert a back emf that causes the fault current to fall. The capability of the inductive element to slow down the rate of rise of current in the DC electrical network results in a lower peak fault current that has to be carried by the DC circuit interruption device in comparison to the peak fault current that has to be carried by the DC circuit interruption device in the absence of the current limiter. This thereby reduces the required current interruption capability of the DC circuit interruption device and provides savings in terms of size, weight and cost of the DC circuit interruption device.

The controller may be configured to selectively control the switching of the bidirectional switch to either of the first and second modes to enable the second electrical block to form a current path that allows current to freewheel around a loop formed by the first and second electrical blocks. When the fault current begins to fall, the bidirectional switch is switched to either of the first and second modes depending on the current direction of the fault current. If the fault current flows in the second current direction, the bidirectional switch is switched to the first mode to enable the second electrical block to form a current path that allows current to freewheel around a loop formed by the first and second electrical blocks. If the fault current flows in the first current direction, the bidirectional switch is switched to the second mode to enable the second electrical block to form a current path that allows current to freewheel around a loop formed by the first and second electrical blocks. The formation of the current path means that the inductive element does not influence the rate of fall in current and thereby allows the fault current to fall at a higher rate than it would have in the absence of the current path.

As such the current limiter according to the invention is capable of being configured to slow down the rate of rise in current in the DC electrical network without slowing down the subsequent rate of fall in current in the DC electrical network.

In contrast, whilst an exemplary variant of the current limiter that omits the second electrical block is capable of slowing down the rate of rise in current in the DC electrical network, the inability of the exemplary variant to form the current path that allows current to freewheel around a loop formed by the first and second electrical blocks means that the inductive element influences the subsequent rate of fall in current, thus also slowing down the subsequent rate of fall in current in the DC electrical network and thereby increasing the time taken for fault clearance in the DC electrical network.

The configuration of the current limiter according to the invention therefore results in a current limiter that is capable of selectively limiting the rate of change of current in the DC electrical network and reducing the time taken for fault clearance in the DC electrical network.

The inclusion of the bidirectional switch in the second electrical block enables the current limiter according to the invention to selectively limit the rate of change of current in the DC electrical network for both of the first and second current directions between the first and second terminals of the current limiter. This renders the current limiter according to the invention compatible for use not only with any type of DC electrical network (e.g. radial DC transmission lines) in which both the power flow and the fault current are always in only one of the first and second current directions, but also with any type of DC electrical network (e.g. a meshed DC power grid) in which the power flow and the fault current through the current limiter can be in either of the first and second current directions, since the latter type of DC electrical network is likely to require current limitation and/or interruption in both of the first and second current directions. This thereby enables the current limiter according to the invention to be used with a wide range of DC power applications.

Also, when the current limiter according to the invention is employed for use with a DC power grid, the configuration of the current limiter permits its installation and use at any location in the DC power grid irrespective of the locations of various generations and loads in the DC power grid.

In embodiments of the invention, the second electrical block may further include a resistive element for dissipating energy.

In use, the flow of a high fault current in the inductive element results in a large amount of energy being inductively stored in the inductive element. The inclusion of the resistive element in the second electrical block allows dissipation of the inductively stored energy via the resistive element. The resistive element can be easily designed to handle large amounts of energy, thus obviating the need for the bidirectional switch to have a sufficiently high rating to be capable of dissipating the inductively stored energy.

In addition the inclusion of the resistive element in the second electrical block reduces the decay time constant of the current freewheeling around the loop formed by the first and second electrical blocks in comparison to the decay time constant of the current freewheeling around the loop formed by the first and second electrical blocks in the absence of the resistive element. This thus removes the need for the bidirectional switch to have a high on-resistance to lower the decay time constant. In contrast, omission of the resistive element from the second electrical block and the use of a bidirectional switch with a low on-resistance could result in a long decay time constant that might affect the ability of the DC circuit interruption device to carry out a repeat operation.

When used in combination with a DC circuit interruption device, the resistive element can be used to dissipate part of the energy that would have been dissipated in energy dissipation components (e.g. surge arrestors) of the DC circuit interruption device. This permits cost savings to be made by designing the resistive element to include one or more low-cost resistors (e.g. expanded metal, external-mounted resistors) that are typically cheaper than the energy dissipation components of the DC circuit interruption device.

Furthermore the inventor has found that, when the current limiter is used in combination with a DC circuit interruption device, a lower amount of energy is dissipated in the DC circuit interruption device and resistive element in comparison to the amount of energy dissipated in a DC circuit interruption device that is operated in the absence of the current limiter or with an exemplary variant of the current limiter that omits the second electrical block. This is due to the reductions in peak fault current and the time taken for the fault current to fall to zero after it reaches its peak magnitude.

For an exemplary variant of the current limiter in which
the bidirectional switch is replaced by a unidirectional switch (which may include a unidirectional thyristor or a plurality of series-connected unidirectional thyristors) or passive current check element (which may include a diode or a plurality of series-connected diodes) that limits current flow to a single current direction; or
the bidirectional switch is replaced by a combination of a unidirectional switch or passive current check element and a resistive element, the replacement of the bidirectional switch with the unidirectional switch or passive current check element means that the exemplary variant can form a current path that allows current to freewheel around a loop formed by the first and second electrical blocks for when the fault current flows in one of the first and second current directions but not the other. This means that the exemplary variant would be capable of selectively limiting the rate of change of current in the DC electrical network for only a single current direction. Consequently the exemplary variant is only compatible for use with any type of DC electrical network in which both the power flow and the fault current are always in only one of the first and second current directions, thus limiting the range of DC power applications with which the exemplary variant can be used.

The configuration of the bidirectional switch in the current limiter according to the invention may vary as long as the bidirectional switch is capable of being switchable to each of the modes.

The bidirectional switch may include a bidirectional controlled thyristor and/or a bidirectional gas discharge switch (e.g. such as a triggered spark gap or plasma switch). The bidirectional gas discharge switch may include a pair of inverse-parallel-connected unidirectional gas discharge sub-switches (e.g. such as a thyratron) or a plurality of series-connected pairs of inverse-parallel-connected unidirectional gas discharge sub-switches.

The bidirectional switch may include a pair of inverse-parallel-connected switching elements or a plurality of series-connected pairs of inverse-parallel-connected switching elements, each inverse parallel-connected switching element including a first switching sub-element, each first switching sub-element including at least one first active switching device. In such embodiments, each first active switching device may be an active switching device with reverse blocking capability.

The number of series-connected pairs of inverse-parallel-connected switching elements in the bidirectional switch may vary depending on the required voltage rating of the bidirectional switch.

The bidirectional switch may include a pair of inverse-series-connected switching elements, each inverse series-connected switching element including a second switching sub-element, each second switching sub-element including at least one second active switching sub-device. In such embodiments, each second active switching device may be an active switching device without reverse blocking capability.

Each active switching device may be a semiconductor device such as a thyristor, a gate turn-off thyristor, a gate commutated thyristor, an integrated gate commutated thyristor, an insulated gate bipolar transistor or any other force-commutated or self-commutated semiconductor device.

In embodiments employing the use of a pair of inverse-series-connected switching elements, the current limiter may further a plurality of passive current check elements, each passive current check element including at least one passive current check device, each of the plurality of passive current check elements being connected in inverse-parallel with a respective one of the second switching sub-elements or with a respective one of the second active switching devices. The or each passive current check device may be any device that is capable of limiting current flow to only one direction, e.g. a diode.

Each passive current check element may include a plurality of series-connected passive current check devices. The number of series-connected passive current check devices in each passive current check element may vary depending on the required voltage rating of the bidirectional switch.

Each switching sub-element may include a plurality of series-connected active switching devices. The number of series-connected active switching devices in each switching sub-element may vary depending on the required voltage rating of the bidirectional switch.

The controller may be configured to control the switching of the bidirectional switch to each of the modes as follows.

The voltage across the bidirectional switch is zero during normal operation of the DC electrical network but changes due to the varying flow of the fault current through the current limiter during the occurrence of a fault in the DC electrical network. More specifically, as a result of the rise and subsequent fall of fault current during the occurrence of a fault in the DC electrical network, the bidirectional switch initially experiences a first voltage with a negative voltage direction relative to one of the first and second current directions followed by a second voltage with a positive voltage direction relative to that current direction. In other words, as a result of the rise and subsequent fall of fault current during the occurrence of a fault in the DC electrical network, the bidirectional switch initially experiences a first voltage with a positive voltage direction relative to the other of the first and second current directions followed by a second voltage with a negative voltage direction relative to that current direction.

For the purposes of this specification, the sign convention in respect of voltage direction is defined as follows.

A voltage having a negative voltage direction relative to the first current direction (and therefore having a positive voltage direction relative to the second current direction) tends to maintain the current flowing in the first current direction.

A voltage having a positive voltage direction relative to the first current direction (and therefore having a negative voltage direction relative to the second current direction) tends to oppose a rise in the current flowing in the first current direction.

A voltage having a negative voltage direction relative to the second current direction (and therefore having a positive voltage direction relative to the first current direction) tends to maintain the current flowing in the second current direction.

A voltage having a positive voltage direction relative to the second current direction (and therefore having a negative voltage direction relative to the first current direction) tends to oppose a rise in the current flowing in the second current direction.

The aforementioned voltage pattern during the occurrence of a fault in the DC electrical network can be used to define a simple and robust logic for the controller to control the switching of the bidirectional switch to each of the first and second modes, as follows.

The controller may be configured to control the switching of the bidirectional switch to inhibit current flow through the second electrical block in one of the first and second current directions when a voltage across the bidirectional switch changes from a zero voltage to a voltage having a positive voltage direction relative to that current direction.

The controller may be configured to control the switching of the bidirectional switch to the first or second mode upon a voltage generated across the inductive element changing from opposing a rise in the current flowing therethrough to maintaining the current flowing therethrough. Examples of the controller configured in this manner is described as follows.

The controller may be configured to control the switching of the bidirectional switch to switch to the first mode upon a voltage across the bidirectional switch changing to a second voltage with a positive voltage direction relative to the first current direction when the voltage across the bidirectional switch changes to the second voltage from a first voltage with a negative voltage direction relative to the first current direction.

The controller may be configured to control the switching of the bidirectional switch to switch to the second mode upon a voltage across the bidirectional switch changing to a second voltage with a positive voltage direction relative to the second current direction when the voltage across the bidirectional switch changes to the second voltage from a first voltage with a negative voltage direction relative to the second current direction.

The configuration of the controller in this manner results in a current limiter that can operate autonomously, thus removing the need for a remote central control system to control the switching of the bidirectional switch and for current measurement hardware to measure the polarity of current flowing through the current limiter. This provides savings in terms of hardware numbers and cost, especially when multiple current limiters are employed for the same DC electrical network.

The controller may further include a control circuit for transmitting a control signal to switch the bidirectional switch. The control circuit may include an energy storage device that is arranged to be chargeable by the first voltage, wherein the control circuit is configured to transmit the control signal to switch the bidirectional switch upon the energy storage device reaching a predefined charge level.

In embodiments of the invention employing the use of a control circuit, the energy storage device may be configured to reach the predefined charge level when the voltage across the bidirectional switch changes to the second voltage.

The inclusion of the control circuit in the current limiter further improves the ability of the current limiter to operate autonomously. As mentioned earlier, the ability of the current limiter to operate autonomously removes the need for a remote central control system to control the switching of the bidirectional switch and for current measurement hardware to measure the polarity of current flowing through the current limiter, thus providing savings in terms of hardware numbers and cost, especially when multiple current limiters are employed for the same DC electrical network.

Preferred embodiments of the invention will now be described, by way of example only, with reference to the accompanying drawings in which.

Figure 1:
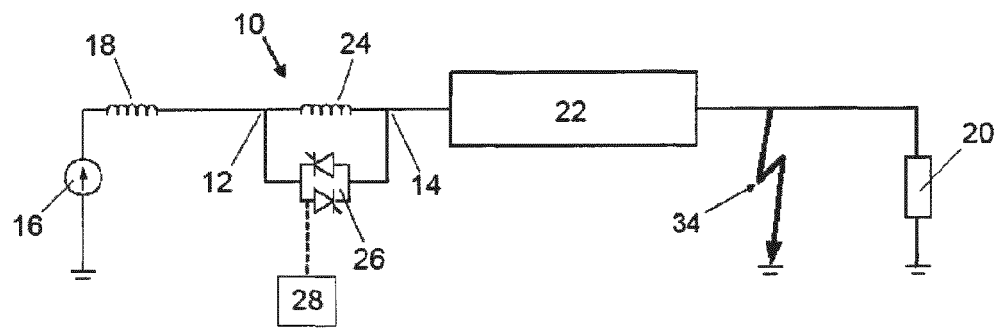
FIG. 1 shows, in schematic form, a current limiter according to a first embodiment of the invention.

A first current limiter 10 according to a first embodiment of the invention is shown in FIG. 1.

The first current limiter 10 includes first and second electrical blocks. The first and second electrical blocks are connected in parallel between first and second terminals 12,14.

In use, the first and second terminals 12,14 are connected to a DC electrical network that includes a DC supply voltage 16, a source impedance 18 and an electrical load 20. More particularly, in use, the first terminal 12 is connected in series with the DC supply voltage 16 via the source impedance 18 while the second terminal 14 is connected to the electrical load 20 via a DC circuit interruption device 22.

The first electrical block includes an inductive element 24 in the form of a single inductor. The inductive element 24 is connected in series between the first and second terminals 12,14.

It is envisaged that, in other embodiments of the invention, the single inductor may be replaced by a plurality of inductors in order to vary the inductance rating of the inductive element 24.

The second electrical block includes a bidirectional switch 26, which is connected in series between the first and second terminals 12,14. The bidirectional switch 26 consists of a pair of inverse-parallel-connected thyristors.

It is envisaged that, in other embodiments of the invention, the pair of inverse-parallel-connected thyristors may be replaced by a plurality of series-connected pairs of inverse-parallel-connected thyristors in order to increase the voltage rating of the bidirectional switch 26.

The structure of the bidirectional switch 26 permits its configuration in any of three modes, which are:
- a blocking mode in which both thyristors are opened to inhibit current flow through the second electrical block in the first and second current directions, the first and second current directions being opposite to each other;
- a first mode in which a first thyristor is opened and a second thyristor is closed to permit current flow through the second electrical block in the first current direction and at the same time inhibit current flow through the second electrical block in the second current direction;
- a second mode in which the first thyristor is closed and the second thyristor is opened to permit current flow through the second electrical block in the second current direction and at the same time inhibit current flow through the second electrical block in the first current direction.

As mentioned earlier, for the purposes of the specification, the first current direction is from the first terminal 12 to the second terminal 14 (which is shown as left to right in FIG. 1) while the second current direction is from the second terminal 14 to the first terminal 12 (which is shown as right to left in FIG. 1).

The first current limiter 10 further includes a controller 28 to control the switching of the bidirectional switch 26 to each of the first, second and third modes.

Figure 2:
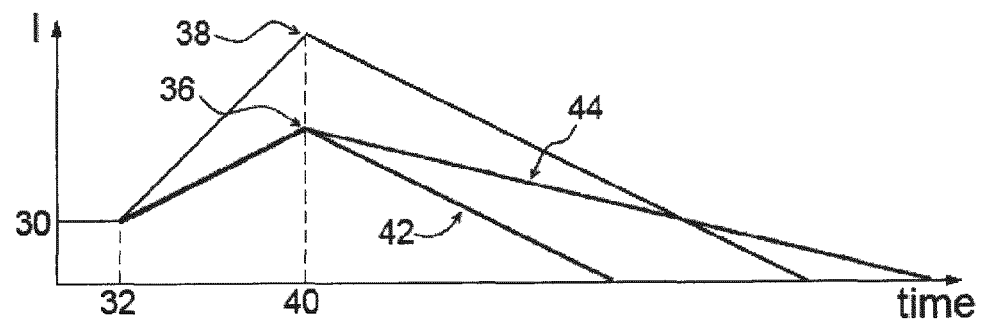
FIG. 2 illustrates, in graph form, the changes in current in a DC electrical network during the operation of the current limiter of FIG. 1.

Operation of the first current limiter 10 is described as follows with reference to FIG. 2 which illustrates, in graph form, the change in current in the DC electrical network during the operation of the first current limiter 10.

During normal operation of the DC electrical network, a normal operating current 30 of the DC electrical network flows from the DC supply voltage 16 to the electrical load 20 via the first current limiter 10. The normal operating current 30 flows through the first current limiter 10 in the first current direction. At this stage the bidirectional switch 26 is switched to the blocking mode. This means that the normal operating current 30 flows through the inductive element 24 of the first electrical block but is inhibited from flowing through the second electrical block during normal operation of the DC electrical network.

A high fault current may be created by the occurrence 32 of a fault or other abnormal operating condition in the DC electrical network. In FIG. 1, the fault 34 is shown as a short circuit to ground from a point between the DC circuit interruption device 22 and the electrical load 20. The DC supply voltage 16 drives the fault current to continue flowing from the DC supply voltage 16 to the electrical load 20 via the first current limiter 10 (i.e. the fault current flows through the first current limiter 10 in the first current direction), thus resulting in a rise in current flowing through the inductive element 24. At this stage the bidirectional switch 26 remains in the blocking mode to block the fault current from flowing through the second electrical block.

The rise in current flowing through the inductive element 24 causes a corresponding increase in magnetic flux, the rate of change of which in turn generates an emf that opposes the rise of current flowing through the inductive element 24. This enables the inductive element 24 to slow down the rate of rise of current in the DC electrical network until the DC circuit interruption device 22 is opened to insert a back emf that causes the fault current to fall. The capability of the inductive element 24 to slow down the rate of rise of current in the DC electrical network reduces the peak fault current 36 that has to be carried by the DC circuit interruption device 22 in comparison to the peak fault current 38 that has to be carried by the DC circuit interruption device 22 in the absence of the first current limiter 10, as shown in FIG. 2. This thereby reduces the required current interruption capability of the DC circuit interruption device 22 and provides savings in terms of size, weight and cost of the DC circuit interruption device 22.

When the fault current begins to fall 40, the controller 28 controls the switching of the bidirectional switch 26 to the second mode. This results in the second electrical block forming a current path that allows current to freewheel around a loop formed by the first and second electrical blocks. The formation of the current path means that the inductive element 24 does not influence the rate of fall in current and thereby allows the fault current to fall at a higher rate 42 than it would have 44 in the absence of the current path.

If, in use, the configuration of the DC electrical network changes such that the first current limiter 10 is connected in a reverse direction relative to the DC electrical network (i.e. the second terminal 14 is connected in series with the DC supply voltage 16 via the source impedance 18 and the first terminal 12 is connected to the electrical load 20 via the DC circuit interruption device 22), the fault current flows in the second current direction instead of the first current direction. Therefore, when the fault current begins to fall 40, the controller 28 controls the switching of the bidirectional switch 26 to the first mode to enable the second electrical block to form a current path that allows current to freewheel around a loop formed by the first and second electrical blocks. Likewise, the formation of the current path means that the inductive element 24 does not influence the rate of fall in current and thereby allows the fault current to fall at a higher rate than it would have 44 in the absence of the current path.

As such the first current limiter 10 is capable of being configured to slow down the rate of rise in current in the DC electrical network without slowing down the subsequent rate of fall in current in the DC electrical network.

Figure 3:
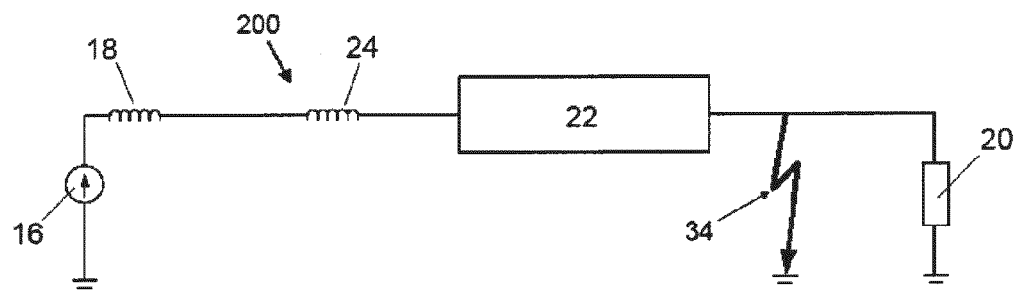
FIG. 3 shows, in schematic form, a first exemplary variant of the current limiter of FIG. 1.

FIG. 3 shows, in schematic form, a first exemplary variant 200 of the first current limiter 10 in which the first exemplary variant 200 omits the second electrical block. Whilst the first exemplary variant 200 is capable of slowing down the rate of rise in current in the DC electrical network, the inability of the first exemplary variant 200 to form the current path that allows current to freewheel around a loop formed by the first and second electrical blocks means that the inductive element 24 influences the rate of fall in current, thus also slowing down the subsequent rate of fall in current in the DC electrical network and thereby increasing the time taken for fault clearance in the DC electrical network, as shown in FIG. 2.

The configuration of the first current limiter 10 according to the invention therefore results in a first current limiter 10 that is capable of selectively limiting the rate of change of current in the DC electrical network and reducing the time taken for fault clearance in the DC electrical network.

The inclusion of the bidirectional switch 26 in the second electrical block enables the first current limiter 10 to selectively limit the rate of change of current in the DC electrical network for both of the first and second current directions between the first and second terminals 12,14 of the first current limiter 10. This renders the first current limiter 10 compatible for use not only with any type of DC electrical network in which both the power flow and the fault current are always in only one direction, but also with any type of DC electrical network in which the power flow and the fault current through the first current limiter 10 can be in either of the first and second current directions, since the latter type of DC electrical network is likely to require current limitation and/or interruption in both of the first and second current directions. This thereby enables the first current limiter 10 to be used with a wide range of DC power applications.

Also, when the first current limiter 10 according to the invention is employed for use with a DC power grid, the configuration of the first current limiter 10 permits its installation and use at any location in the DC power grid irrespective of the locations of various generations and loads in the DC power grid.

The controller 28 may be further configured to control the switching of the bidirectional switch 26 from the blocking mode to each of the first and second modes as follows.

Figure 4A:
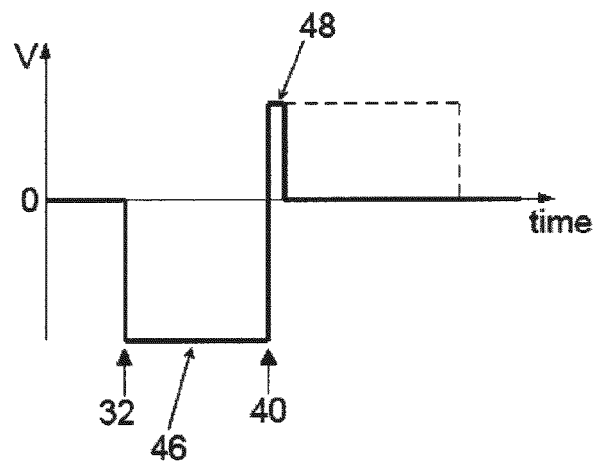
FIGS. 4a and 4b illustrates, in graph form, the change in voltage across the bidirectional switch relative to first and second current directions during normal operation of the DC electrical network and during the occurrence of a fault in the DC electrical network.
Figure 4B:
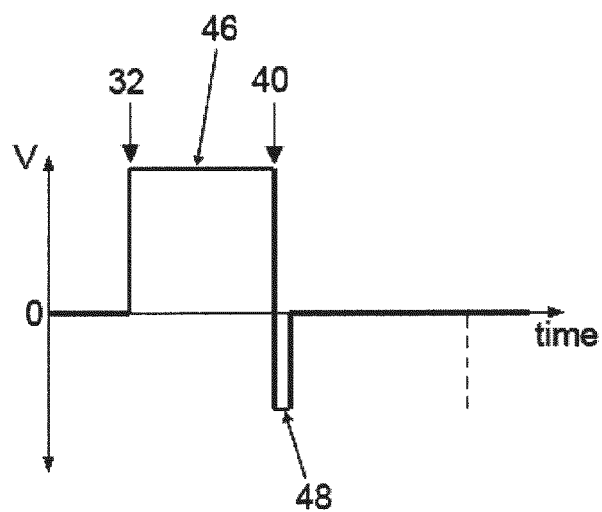

FIGS. 4a and 4b illustrates, in graph form, the change in voltage across the bidirectional switch 26 relative to the first and second current directions during normal operation of the DC electrical network and during the occurrence of a fault in the DC electrical network.

The voltage across the bidirectional switch 26 is zero during normal operation of the DC electrical network but changes due to the varying flow of the fault current through the first current limiter 10 during the occurrence 32 of a fault in the DC electrical network. More specifically, as a result of the rise and subsequent fall of fault current during the occurrence 32 of a fault in the DC electrical network, the bidirectional switch 26 initially experiences a first voltage 46 with a negative voltage direction relative to one of the first and second current directions followed by a second voltage 48 with a positive voltage direction relative to that current direction when the fault current starts to fall 40, as shown in FIG. 4a. In other words, as a result of the rise and subsequent fall of fault current during the occurrence of a fault in the DC electrical network, the bidirectional switch 26 initially experiences a first voltage 46 with a positive voltage direction relative to the other of the first and second current directions followed by a second voltage 48 with a negative voltage direction relative to that current direction when the fault current starts to fall 40, as shown in FIG. 4b.

The sign convention in respect of voltage direction is as defined earlier in this specification.

The aforementioned voltage pattern during the occurrence of a fault in the DC electrical network can be used to define a simple and robust logic for the controller 28 to control the switching of the bidirectional switch 26 from the blocking mode to each of the first and second modes as follows.

The controller 28 controls the switching of the bidirectional switch 26 to inhibit current flow through the second electrical block in one of the first and second current directions when a voltage across the bidirectional switch 26 changes from a zero voltage to a voltage having a positive voltage direction relative to that current direction.

The controller 28 controls the switching of the bidirectional switch 26 to switch from the blocking mode to the first or second mode upon a voltage across the inductive element 24 changing from opposing a rise in the current flowing therethrough to maintaining the current flowing therethrough. Examples of the controller 29 controlling the switching of the bidirectional switch 26 to switch from the blocking mode to the first or second mode are described as follows.

The controller 28 controls the switching of the bidirectional switch 26 to switch from the blocking mode to the first mode upon a voltage across the bidirectional switch 26 changing to a second voltage with a positive voltage direction relative to the first current direction when the voltage across the bidirectional switch 26 changes to the second voltage from a first voltage with a negative voltage direction relative to the first current direction.

The controller 28 controls the switching of the bidirectional switch 26 to switch from the blocking mode to the second mode upon a voltage across the bidirectional switch 26 changing to a second voltage with a positive voltage direction relative to the second current direction when the voltage across the bidirectional switch 26 changes to the second voltage from a first voltage with a negative voltage direction relative to the second current direction.

Application of the aforementioned logic to the earlier described operation of the first current limiter 10 is described as follows.

As mentioned earlier, during normal operation of the DC electrical network, the bidirectional switch 26 is switched to the blocking mode.

During the occurrence 32 of a fault in the DC electrical network resulting in the flow of a fault current in the first current direction, the voltage across the bidirectional switch 26 changes from zero to a first voltage with a negative voltage direction relative to the second current direction and a positive voltage direction relative to the first current direction. In applying the aforementioned logic, the controller 28 controls the switching of the bidirectional switch 26 to inhibit current flow through the second electrical block in the first current direction. Thus, the bidirectional switch 26 is kept in the blocking mode.

Once the DC circuit interruption device 22 is opened and the fault current starts to fall 40, the voltage across the bidirectional switch 26 changes from the first voltage to a second voltage with a positive voltage direction relative to the second current direction and a negative voltage direction relative to the first current direction. In applying the aforementioned logic, the controller 28 controls the switching of the bidirectional switch 26 to switch from the blocking mode to the second mode upon the voltage across the bidirectional switch 26 changing to the second voltage. Thus, the bidirectional switch 26 is switched to the second mode to enable the second electrical block to form the current path.

Similarly, during the occurrence 32 of a fault in the DC electrical network resulting in the flow of a fault current in the second current direction, the voltage across the bidirectional switch 26 changes from zero to a first voltage with a negative voltage direction relative to the first current direction and a positive voltage direction relative to the second current direction. In applying the aforementioned logic, the controller 28 controls the switching of the bidirectional switch 26 to inhibit current flow through the second electrical block in the second current direction. Thus, the bidirectional switch 26 is kept in the blocking mode.

Once the DC circuit interruption device 22 is opened and the fault current starts to fall 40, the voltage across the bidirectional switch 26 changes from the first voltage to a second voltage with a positive voltage direction relative to the first current direction and a negative voltage direction relative to the second current direction. In applying the aforementioned logic, the controller 28 controls the switching of the bidirectional switch 26 to switch from the blocking mode to the first mode upon the voltage across the bidirectional switch 26 changing to the second voltage. Thus, the bidirectional switch 26 is switched to the first mode to enable the second electrical block to form the current path.

The configuration of the controller 28 in this manner results in a first current limiter 10 that can operate autonomously, thus removing the need for a remote central control system to control the switching of the bidirectional switch 26 and for current measurement hardware to measure the polarity of current flowing through the first current limiter 10. This provides savings in terms of hardware numbers and cost, especially when multiple first current limiters 10 are employed for the same DC electrical network.

It is envisaged that, in other embodiments of the invention, the controller may further include a control circuit for transmitting a control signal to switch the bidirectional switch. The control circuit may include an energy storage device that is arranged to be chargeable by the first voltage, wherein the control circuit is configured to transmit the control signal to switch the bidirectional switch upon the energy storage device reaching a predefined charge level. The energy storage device may be configured to reach the predefined charge level when the voltage across the bidirectional switch changes to the second voltage.

The inclusion of the control circuit in the first current limiter 10 further improves the ability of the first current limiter 10 to operate autonomously. As mentioned earlier, the ability of the first current limiter 10 to operate autonomously removes the need for a remote central control system to control the switching of the bidirectional switch 26 and for current measurement hardware to measure the polarity of current flowing through the first current limiter 10, thus providing savings in terms of hardware numbers and cost, especially when multiple first current limiters 10 are employed for the same DC electrical network.

Figure 5:
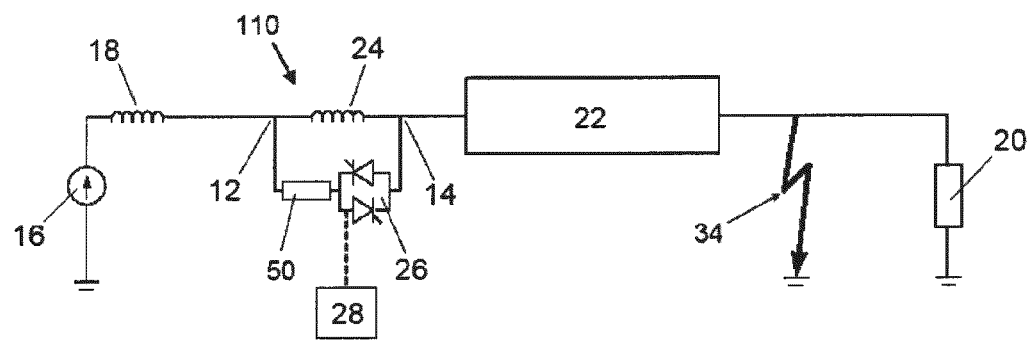
FIG. 5 shows, in schematic form, a current limiter according to a second embodiment of the invention.

A second current limiter 110 according to a second embodiment of the invention is shown in FIG. 5. The second current limiter 110 of FIG. 5 is similar in structure and operation to the first current limiter 10 of FIG. 1, and like features share the same reference numerals. The second current limiter 110 differs from the first current limiter 10 in that the second electrical block of the second current limiter 110 further includes a resistive element 50 in the form of a single resistor.

It is envisaged that, in other embodiments of the invention, the single resistor may be replaced by a plurality of parallel-connected and/or series-connected resistors in order to vary the resistance rating of the resistive element 50.

During the occurrence of a fault in the DC electrical network, the flow of the high fault current in the inductive element 24 results in a large amount of energy being inductively stored in the inductive element 24. The inclusion of the resistive element 50 in the second electrical block allows dissipation of the inductively stored energy via the resistive element 50. The resistive element 50 can be easily designed to handle large amounts of energy, thus obviating the need for the bidirectional switch 26 to have a sufficiently high rating to be capable of dissipating the inductively stored energy.

The inclusion of the resistive element 50 in the second electrical block reduces the decay time constant (L/R) of the current freewheeling around the loop formed by the first and second electrical blocks in comparison to the decay time constant of the current freewheeling around the loop formed by the first and second electrical blocks in the absence of the resistive element 50 (where L is the inductance rating of the inductive element 24 and R is the resistance rating of the resistive element 50). This thus removes the need for the bidirectional switch 26 to have a high on-resistance to lower the decay time constant. In contrast, omission of the resistive element 50 from the second electrical block and the use of a bidirectional switch 26 with a low on-resistance could result in a long decay time constant that might affect the ability of the DC circuit interruption device 22 to carry out a repeat operation.

The resistive element 50 can be used to dissipate part of the energy that would have been dissipated in energy dissipation components (e.g. surge arrestors) of the DC circuit interruption device 22. This permits cost savings to be made by designing the resistive element 50 to include one or more low-cost resistors (e.g. expanded metal, external-mounted resistors) that are typically cheaper than the energy dissipation components of the DC circuit interruption device 22.

Furthermore the inventor has found that a lower amount of energy is dissipated in the DC circuit interruption device 22 and resistive element 50 in comparison to the amount of energy dissipated in a DC circuit interruption device 22 that is operated in the absence of the second current limiter 110 or with an exemplary variant of the second current limiter 110 that omits the second electrical block. This is due to the reductions in peak fault current and the time taken for the fault current to fall to zero after it reaches its peak magnitude.

Figure 6:
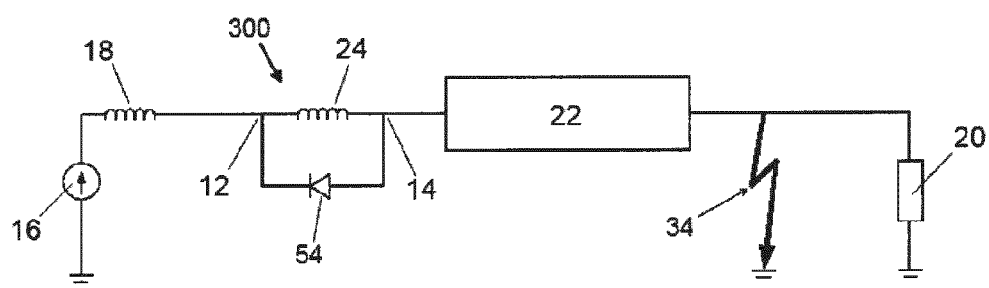
FIG. 6 shows, in schematic form, a second exemplary variant of the current limiter of FIG. 1.

FIG. 6 shows, in schematic form, a second exemplary variant 300 of the first current limiter 10 in which the bidirectional switch 26 is replaced by a passive current check element 54 that limits current flow to a single current direction.

Figure 7:
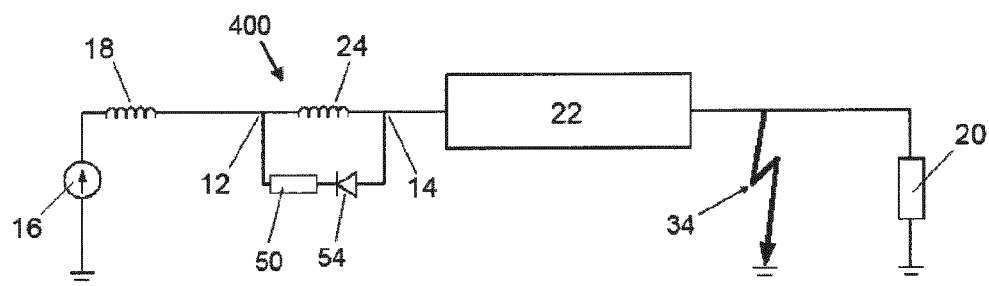
FIG. 7 shows, in schematic form, a third exemplary variant of the current limiter of FIG. 1.

FIG. 7 shows, in schematic form, a third exemplary variant 400 of the first current limiter 10 in which the bidirectional switch 26 is replaced by a series-connection of a passive current check element 54 and a resistive element 50.

In FIGS. 7 and 8, the passive current check element 54 is a diode. It is envisaged that the passive current check element 54 may be replaced by a plurality of series-connected passive current check elements or a unidirectional switch. The unidirectional switch may include a unidirectional thyristor or a plurality of series-connected unidirectional thyristors.

For the second and third exemplary variants 300,400, the replacement of the bidirectional switch 26 with the passive current check element 54 means that each of the second and third exemplary variants 300,400 can form a current path that allows current to freewheel around a loop formed by the first and second electrical blocks for when the fault current flows in one of the first and second current directions but not the other. This means that each of the second and third exemplary variants 300,400 would be capable of selectively limiting the rate of change of current in the DC electrical network for only a single current direction. Consequently each of the second and third exemplary variants 300,400 is only compatible for use with any type of DC electrical network in which both the power flow and the fault current are always in only one of the first and second current directions, thus limiting the range of DC power applications with which each of the second and third exemplary variants 300,400 can be used.

It is envisaged that, in other embodiments of the invention, the configuration of the bidirectional switch 26 in the first and second current limiters 10,110 may vary as long as the bidirectional switch 26 is capable of being switchable to each of the modes.

Examples of various configurations of the bidirectional switch are described as follows.

Figure 8A:
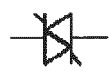
FIGS. 8a to 8e respectively show, in schematic form, various configurations of a bidirectional switch.

The bidirectional switch may include a bidirectional controlled thyristor (as shown in FIG. 8*a*) and/or a bidirectional gas discharge switch (e.g. such as a triggered spark gap or plasma switch). The bidirectional gas discharge switch may include a pair of inverse-parallel-connected unidirectional gas discharge sub-switches (e.g. such as a thyratron) or a plurality of series-connected pairs of inverse-parallel-connected unidirectional gas discharge sub-switches.

Figure 8B:
Figure 8C:
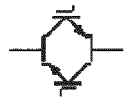

The bidirectional switch may include a pair of inverse-parallel-connected switching elements (as shown in FIGS. 8b and 8c) or a plurality of series-connected pairs of inverse-parallel-connected switching elements, each inverse parallel-connected switching element including a first switching sub-element, each first switching sub-element including at least one first active switching device. Each first active switching device may be an active switching device with reverse blocking capability.

The number of series-connected pairs of inverse-parallel-connected switching elements in the bidirectional switch may vary depending on the required voltage rating of the bidirectional switch.

The bidirectional switch may include a pair of inverse-series-connected switching elements, each inverse series-connected switching element including a second switching sub-element, each second switching sub-element including at least one second active switching sub-device. Each second active switching device may be an active switching device without reverse blocking capability.

Each active switching device may be a semiconductor device such a gate turn-off thyristor, a gate commutated thyristor, an integrated gate commutated thyristor, an insulated gate bipolar transistor or any other force-commutated or self-commutated semiconductor device.

Figure 8D:
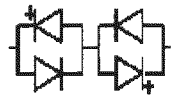
Figure 8E:
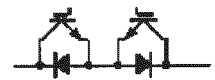

When the bidirectional switch includes a pair of inverse-series-connected switching elements, the current limiter may further a plurality of passive current check elements, each passive current check element including at least one passive current check device, each of the plurality of passive current check elements being connected in inverse-parallel with a respective one of the second switching sub-elements or with a respective one of the second active switching devices (as shown in FIGS. 8d and 8e). The or each passive current check device may be any device that is capable of limiting current flow to only one direction, e.g. a diode.

Each passive current check element may include a plurality of series-connected passive current check devices. The number of series-connected passive current check devices in each passive current check element may vary depending on the required voltage rating of the bidirectional switch.

Each switching sub-element may include a plurality of series-connected active switching devices. The number of series-connected active switching devices in each switching sub-element may vary depending on the required voltage rating of the bidirectional switch.

The invention claimed is:

1. A current limiter for selectively limiting a rate of change of a fault current in a DC electrical network, the current limiter comprising:
 a first electrical block including an inductive element; and
 a second electrical block including a bidirectional switch, the first electrical block being connected in parallel with the second electrical block between first and second terminals, the first and second terminals being connectable to the DC electrical network,
 wherein the bidirectional switch is switchable to a first mode to permit current flow through the second electrical block in a first current direction and at a same time inhibit current flow through the second electrical block in a second current direction, the first and second current directions being opposite to each other, and the bidirectional switch is switchable to a second mode to permit current flow through the second electrical block in the second current direction and at a same time inhibit current flow through the second electrical block in the first current direction, and
 wherein the current limiter further includes a controller to control the switching of the bidirectional switch to each of the first and second modes, and the controller is configured to selectively control the switching of the bidirectional switch to either of the first and second modes while a fault current is flowing through the current limiter, to enable the second electrical block to form a current path that allows current to freewheel around a loop formed by the first and second electrical blocks and thereby allows the fault current to fall at a higher rate than it would do in the absence of the current path.

2. The current limiter according to claim 1 wherein the bidirectional switch is switchable to a blocking mode to inhibit current flow through the second electrical block in the first and second current directions.

3. The current limiter according to claim 1 wherein the second electrical block further includes a resistive element for dissipating energy.

4. The current limiter according to claim 1 wherein the bidirectional switch includes a bidirectional controlled thyristor and/or a bidirectional gas discharge switch.

5. The current limiter according to claim 1 wherein the bidirectional switch includes a pair of inverse-parallel-connected switching elements or a plurality of series-connected pairs of inverse-parallel-connected switching elements, each inverse parallel-connected switching element including a first switching sub-element, each first switching sub-element including at least one first active switching device.

6. The current limiter according to claim 5 wherein each first active switching device is an active switching device with reverse blocking capability.

7. The current limiter according to claim 1 wherein the bidirectional switch includes a pair of inverse-series-connected switching elements, each inverse series-connected switching element including a second switching sub-element, each second switching sub-element including at least one second active switching sub-device.

8. The current limiter according to claim 5 wherein each switching sub-element includes a plurality of series-connected active switching devices.

9. The current limiter according to claim 7 wherein each second active switching device is an active switching device without reverse blocking capability.

10. The current limiter according to claim 7 further including a plurality of passive current check elements, each passive current check element including at least one passive current check device, each of the plurality of passive current check elements being connected in inverse-parallel with a respective one of the second switching sub-elements or with a respective one of the second active switching devices.

11. The current limiter according to claim 10 wherein each passive current check element includes a plurality of series-connected passive current check devices.

12. The current limiter according to claim 1 wherein the controller is configured to control the switching of the bidirectional switch to inhibit current flow through the second electrical block in one of the first and second current directions when a voltage across the bidirectional switch changes from a zero voltage to a voltage having a positive voltage direction relative to that current direction.

13. The current limiter according to claim 1 wherein the controller is configured to control the switching of the bidirectional switch to the first or second mode upon a voltage generated across the inductive element changing from opposing a rise in a current flowing therethrough to maintaining the current flowing therethrough.

14. The current limiter according to claim 1 wherein the controller is configured to control the switching of the bidirectional switch to switch to the first mode upon a voltage across the bidirectional switch changing to a second voltage with a positive voltage direction relative to the first current direction when the voltage across the bidirectional switch changes to the second voltage from a first voltage with a negative voltage direction relative to the first current direction.

15. The current limiter according to claim 14 wherein the controller further includes a control circuit for transmitting a control signal to switch the bidirectional switch, the control circuit including an energy storage device that is arranged to be chargeable by the first voltage, wherein the control circuit is configured to transmit the control signal to switch the bidirectional switch upon the energy storage device reaching a predefined charge level.

16. The current limiter according to claim 15 wherein the energy storage device is configured to reach the predefined charge level when the voltage across the bidirectional switch changes to the second voltage.

17. The current limiter according to claim 1 wherein the controller is configured to control the switching of the bidirectional switch to switch to the second mode upon a voltage across the bidirectional switch changing to a second voltage with a positive voltage direction relative to the second current direction when the voltage across the bidirectional switch changes to the second voltage from a first voltage with a negative voltage direction relative to the second current direction.

* * * * *